United States Patent
Bak et al.

(10) Patent No.: US 6,910,205 B2
(45) Date of Patent: *Jun. 21, 2005

(54) INTERPRETING FUNCTIONS UTILIZING A HYBRID OF VIRTUAL AND NATIVE MACHINE INSTRUCTIONS

(75) Inventors: Lars Bak, Palo Alto, CA (US); Robert Griesemer, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 10/194,040

(22) Filed: Jul. 12, 2002

(65) Prior Publication Data

US 2002/0184399 A1 Dec. 5, 2002

Related U.S. Application Data

(63) Continuation of application No. 08/884,856, filed on Jun. 30, 1997, now Pat. No. 6,513,156.

(51) Int. Cl.[7] .............................. G06F 9/45; G06F 9/455
(52) U.S. Cl. ........................ 717/151; 717/159; 717/148; 717/139; 718/1
(58) Field of Search ............................... 717/151, 159, 717/139, 148; 718/1

(56) References Cited

U.S. PATENT DOCUMENTS

| | | |
|---|---|---|
| 5,329,611 A | 7/1994 | Pechanek et al. |
| 5,367,685 A | 11/1994 | Gosling |
| 5,586,328 A | 12/1996 | Caron et al. |
| 5,758,162 A | 5/1998 | Takayama et al. |
| 5,768,593 A | 6/1998 | Walters et al. |
| 5,845,298 A | 12/1998 | O'Conner et al. |
| 5,898,850 A | 4/1999 | Dickol et al. |
| 5,905,895 A | 5/1999 | Halter |
| 5,925,123 A | 7/1999 | Tremblay et al. |
| 5,953,736 A | 9/1999 | O'Conner et al. |
| 5,995,754 A | * 11/1999 | Holzle et al. ............... 717/158 |
| 6,038,394 A | 3/2000 | Layes |

(Continued)

OTHER PUBLICATIONS

Proebsting, Todd A., "Optimizing an ANSI C Interpreter with Superoperators," pp. 322–332, Jan. 1995.
Hsieh, Cheng–Hsueh et al., "Java Bytecode to Native Code Translation: The caffeine prototype and preliminary results," pp. 90–97, Dec. 1996.
Lambright, H. Dan., "Java Bytecode Optimizations," pp. 206–210, Feb. 1997.
Pittan Thomas, "Two–level Hybrid Interpreter/Native Code Execution for combined space time program efficiency," ACM, pp. 150–152, Jun. 1987.
Kaufer, Stephen et al., "Saber–C, An Interpreter–based programming environment for the C language," USENIX, pp. 161–171, Jun. 1988.
Davidson, Jack W. et al., "Cint: A RISC Interpreter for the C programming language," ACM, pp. 189–198, Jun. 1987.

*Primary Examiner*—Lewis A. Bullock, Jr.
(74) *Attorney, Agent, or Firm*—Beyer Weaver & Thomas LLP

(57) ABSTRACT

Systems and methods for increasing the execution speed of virtual machine instructions for a function are provided. A portion of the virtual machine instructions of the function are compiled into native machine instructions so that the function includes both virtual and native machine instructions. Execution of the native machine instructions may be accomplished by overwriting a virtual machine instruction of the function with a virtual machine instruction that specifies execution of the native machine instructions. Additionally, the original virtual machine instruction may be stored so that the original virtual machine instructions can be regenerated.

14 Claims, 12 Drawing Sheets

U.S. PATENT DOCUMENTS

| | | |
|---|---|---|
| 6,044,220 A | 3/2000 | Breternitz |
| 6,118,940 A | 9/2000 | Alexander et al. |
| 6,170,083 B1 | 1/2001 | Adl-Tabatabai |
| 6,292,883 B1 * | 9/2001 | Augusteijn et al. ......... 712/209 |
| 6,332,216 B1 | 12/2001 | Manjunath |
| 6,349,377 B1 * | 2/2002 | Lindwer ...................... 712/22 |

* cited by examiner

INTERPRETING FUNCTIONS UTILIZING A HYBRID OF VIRTUAL AND NATIVE MACHINE INSTRUCTIONS

This is a Continuation application of prior application Ser. No. 08/884,856 filed on Jun. 30, 1997, now U.S. Pat. No. 6,513,156 the disclosure of which is incorporated herein by reference.

BACKGROUND OF THE INVENTION

The present invention relates to increasing the execution speed of interpreters and, more specifically, increasing the speed of an interpreter executing a Java™ function utilizing a hybrid of virtual and native machine instructions.

The computer era began back in the early 1950s with the development of the UNIVAC. Today, there are countless numbers of computers and computer platforms. Although the variety of computers is a blessing for users, it is a curse for programmers and application developers who have the unfortunate task of modifying or porting an existing computer program to run on a different computer platform.

One of the goals of high level languages is to provide a portable programming environment such that the computer programs may be easily ported to another computer platform. High level languages such as "C" provide a level of abstraction from the underlying computer architecture and their success is well evidenced from the fact that most computer applications are now written in a high level language.

Portability has been taken to new heights with the advent of World Wide Web ("the Web") which is an interface protocol for the Internet which allows communication of diverse computer platforms through a graphical interface. Computers communicating over the Web are able to download and execute small applications called applets. Given that applets may be executed on a diverse assortment of computer platforms, the applets are typically executed by a Java™ virtual machine.

The Java™ programming language is an object-oriented high level programming language developed by Sun Microsystems and designed to be portable enough to be executed on a wide range of computers ranging from small personal computers up to supercomputers. Java programs are compiled into class files which include virtual machine instructions (e.g., bytecodes) for the Java virtual machine. The Java virtual machine is a software emulator of a "generic" computer. An advantage of utilizing virtual machine instructions is the flexibility that is achieved since the virtual machine instructions may be run, unmodified, on any computer system that has a virtual machine implementation, making for a truly portable language. Additionally, other programming languages may be compiled into Java virtual machine instructions and executed by a Java virtual machine.

The Java virtual machine is an interpreter executed as an interpreter program (i.e., software). Conventional interpreters decode and execute the virtual machine instructions of an interpreted program one instruction at a time during execution. Compilers, on the other hand, decode source code into native machine instructions prior to execution so that decoding is not performed during execution. Because conventional interpreters decode each instruction before it is executed repeatedly each time the instruction is encountered, execution of interpreted programs is typically quite slower than compiled programs because the native machine instructions of compiled programs can be executed on the native machine or computer system without necessitating decoding.

A known method for increasing the execution speed of Java interpreted programs of virtual machine instructions involves utilizing a just-in-tine (JIT) compiler. The JIT compiler compiles an entire Java function just before it is called. However, native code generated by a JIT compiler does not always run faster than code executed by an interpreter. For example, if the interpreter is not spending the majority of its time decoding the Java virtual machine instructions, then compiling the instructions with a JIT compiler may not increase the execution speed. In fact, execution may even be slower utilizing the JIT compiler if the overhead of compiling the instructions is more than the overhead of simply interpreting the instructions.

Another known method for increasing the execution speed of Java interpreted programs of virtual machine instructions utilizes "quick" instructions or bytecodes. The "quick" instructions take advantage of the unassigned bytecodes for the Java virtual machine. A "quick" instruction utilizes an unassigned bytecode to shadow another bytecode. The first time that the shadowed bytecode is encountered, the bytecode is replaced by the "quick" bytecode which is a more efficient implementation of the same operation. Although "quick" instructions have been implemented with good results, their flexibility is limited since the number of unassigned bytecodes is limited (and may decrease as new bytecodes are assigned).

Accordingly, there is a need for new techniques for increasing the execution speed of computer programs that are being interpreted. Additionally, there is a need for new techniques that provide flexibility in the way in which interpreted computer programs are executed.

SUMMARY OF THE INVENTION

In general, embodiments of the present invention provide innovative systems and methods for increasing the execution speed of computer programs executed by an interpreter. A portion of a function is compiled into at least one native machine instruction so that the function includes both virtual and native machine instructions during execution. With the invention, the mechanism for increasing the execution speed of the virtual machine instructions is transparent to the user, the hybrid virtual and native machine instructions may be easily transformed back to the original virtual machine instructions, and the flexibility of compiling only certain portions of a function into native machine instructions allows for better optimization of the execution of the function. Several embodiments of the invention are described below.

In one embodiment, a computer implemented method for increasing the execution speed of virtual machine instructions is provided. Virtual machine instructions for a function are input into a computer system. A portion of the function is compiled into native machine instruction(s) so that the function includes both virtual and native machine instructions. A virtual machine instruction of the function may be overwritten with a new virtual machine instruction that specifies the execution of native machine instructions that were compiled from a sequence of virtual machine instructions beginning with the overwritten virtual machine instruction of the function. In preferred embodiments, the virtual machine instructions are Java virtual machine instructions.

In another embodiment, a computer implemented method for increasing the execution speed of virtual machine instructions is provided. Java virtual machine instructions for a function are input into a computer system. A portion of the function is compiled into native machine instruction(s).

A copy of a selected virtual machine instruction at a beginning of the portion of the function is stored and a back pointer to a location of the selected virtual machine instruction is also stored. The selected virtual machine instruction is overwritten with a new virtual machine instruction that specifies execution of the native machine instructions so that the function includes both virtual and native machine instructions. The new virtual machine instruction may include a pointer to a data block in which is stored the native machine instructions, the copy of the selected virtual machine instruction, and the back pointer. Additionally, the original virtual machine instructions that were input may be generated by storing the copy of the selected virtual machine instruction stored in the data block at the location specified by the back pointer.

In another embodiment, a computer implemented method of generating hybrid virtual and native machine instructions is provided. A sequence of virtual machine instructions for a function is input into a computer system. A virtual machine instruction of the sequence of virtual machine instructions is selected and the selected virtual machine instruction is overwritten with a new virtual machine instruction that specifies one or more native machine instructions. The new virtual machine instruction may include a pointer to the one or more native machine instructions which may be stored in a data block. The one or more native machine instructions may be generated from a compilation of a portion of the sequence of virtual machine instructions beginning with the selected virtual machine instruction.

Other features and advantages of the invention will become readily apparent upon review of the following detailed description in association with the accompanying drawings.

DETAILED DESCRIPTION OF PREFERRED EMBODIMENTS

Definitions

Machine instruction—An instruction that directs a computer to perform an operation specified by an operation code (OP code) and optionally one or more operand.

Virtual machine instruction—A machine instruction for a software emulated microprocessor or computer architecture (also called virtual code).

Native machine instruction—A machine instruction that is designed for a specific microprocessor or computer architecture (also called native code).

Class—An object-oriented data type that defines the data and methods that each object of a class will include.

Function—A software routine (also called a subroutine, procedure, member and method).

Snippet—A relatively small piece of compiled native machine instructions and associated information.

Bytecode pointer (BCP)—A pointer that points to the current Java virtual machine instruction (e.g., bytecode) that is being executed.

Program counter (PC)—A pointer that points to the machine instruction of the interpreter that is being executed.

Overview

In the description that follows, the present invention will be described in reference to a preferred embodiment that increases the execution speed of Java virtual machine instructions. However, the invention is not limited to any particular language, computer architecture, or specific implementation. As an example, the invention may be advantageously applied to languages other than Java (e.g., Smalltalk). Therefore, the description of the embodiments that follow is for purposes of illustration and not limitation.

Figure 1:
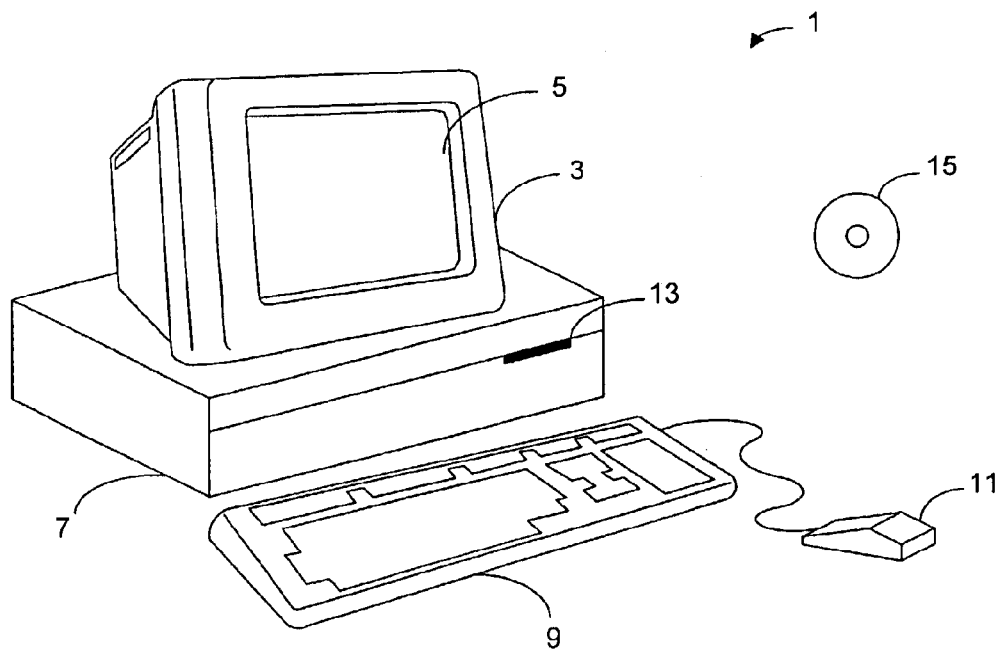
FIG. 1 illustrates an example of a computer system that may be utilized to execute the software of an embodiment of the invention.

FIG. 1 illustrates an example of a computer system that may be used to execute the software of an embodiment of the invention. FIG. 1 shows a computer system 1 which includes a display 3, screen 5, cabinet 7, keyboard 9, and mouse 11. Mouse 11 may have one or more buttons for interacting with a graphical user interface. Cabinet 7 houses a CD-ROM drive 13, system memory and a hard drive (see FIG. 2) which may be utilized to store and retrieve software programs incorporating computer code that implements the invention, data for use with the invention, and the like. Although the CD-ROM 15 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium.

Figure 2:
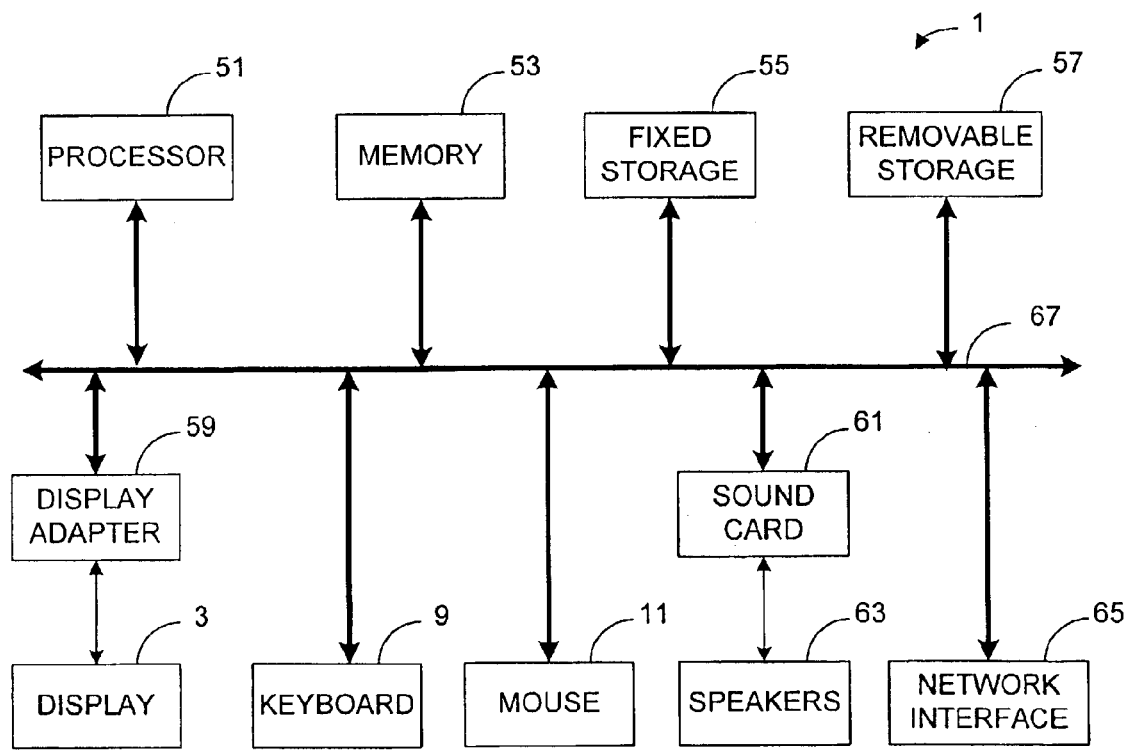
FIG. 2 shows a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention may include additional or fewer subsystems. For example, another computer system could include more than one processor 51 (i.e., a multi-processor system), or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems may also be utilized.

Figure 3:
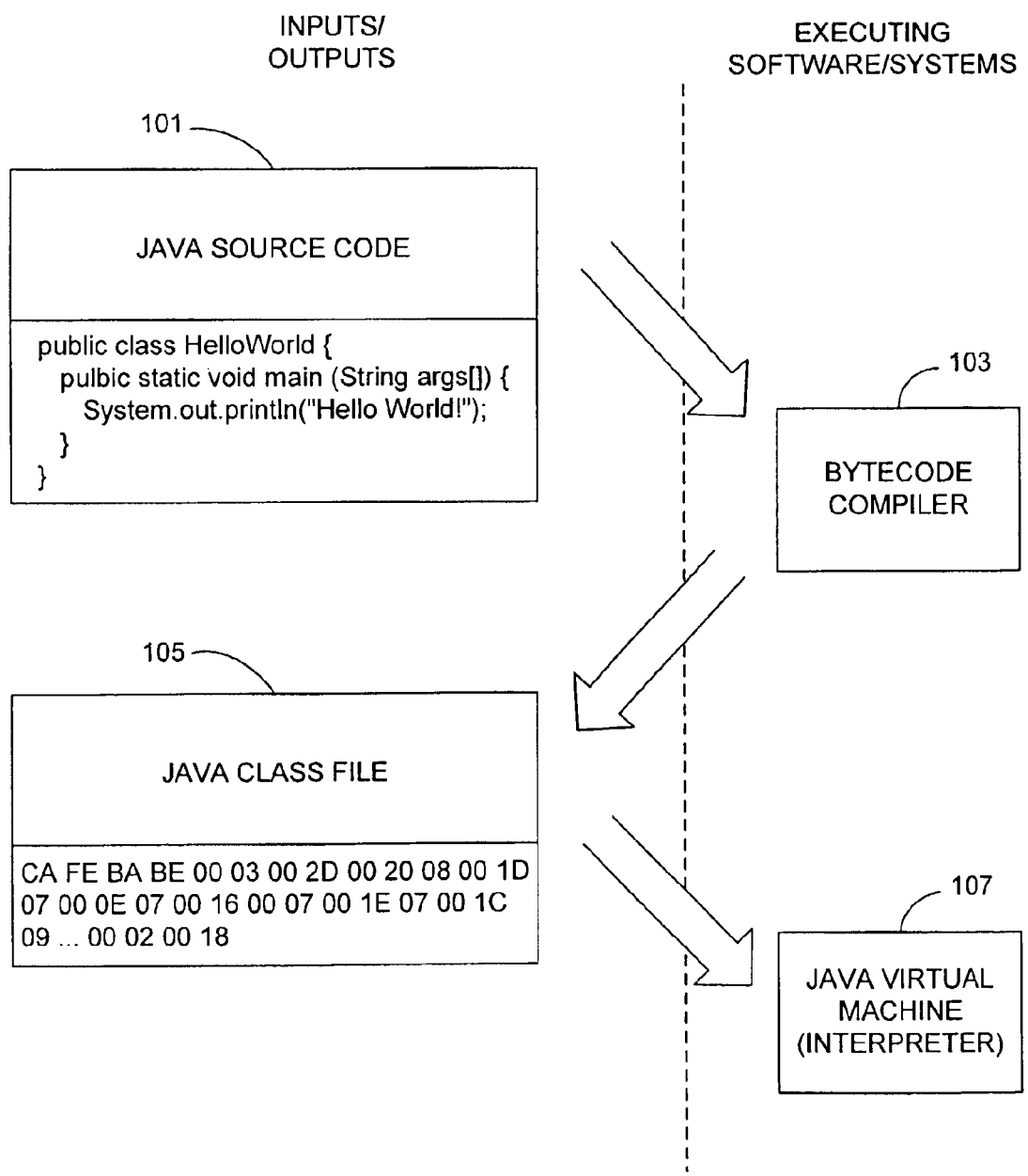
FIG. 3 shows how a Java source code program is executed.

Typically, computer programs written in the Java programming language are compiled into bytecodes or Java virtual machine instructions which are then executed by a Java virtual machine. The bytecodes are stored in class files which are input into the Java virtual machine for interpretation. FIG. 3 shows a progression of a simple piece of Java source code through execution by an interpreter, the Java virtual machine.

Java source code 101 includes the classic Hello World program written in Java. The source code is then input into a bytecode compiler 103 which compiles the source code into bytecodes. The bytecodes are virtual machine instructions as they will be executed by a software emulated computer. Typically, virtual machine instructions are generic (i.e., not designed for any specific microprocessor or computer architecture) but this is not required. The bytecode compiler outputs a Java class file 105 which includes the bytecodes for the Java program.

The Java class file is input into a Java virtual machine 107. The Java virtual machine is an interpreter that decodes and executes the bytecodes in the Java class file. The Java virtual machine is an interpreter, but is commonly referred to as a virtual machine as it emulates a microprocessor or computer architecture in software (e.g., the microprocessor or computer architecture that may not exist).

An interpreter may execute a bytecode program by repeatedly executing the following steps:

Execute—execute operation of the current bytecode

Advance—advance bytecode pointer to next bytecode

Dispatch—fetch the bytecode at the bytecode pointer and jump to the implementation (i.e., execute step) of that bytecode.

The execute step implements the operation of a particular bytecode. The advance step increments the bytecode pointer so that it points to the next bytecode. Lastly, the dispatch step fetches the bytecode at the current bytecode pointer and jumps to the piece of native machine code that implements that bytecode. The execution of the execute-advance-dispatch sequence for a bytecode is commonly called an "interpretation cycle."

Although in a preferred embodiment, the interpreter utilizes the interpretation cycle described above. Many other interpretation cycles may be utilized in conjunction with the present invention. For example, an interpreter may perform dispatch-execute-advance interpretation cycles or there may be more or fewer steps in each cycle. Accordingly, the invention is not limited to the embodiments described herein.

Hybrid Virtual and Native Machine Instructions

In general, the speed in which a program is interpreted can be increased by reducing the average time needed for an interpretation cycle. The invention recognizes the fact that on many modern computers the dispatch step is often the most time consuming step. Accordingly, the advance and dispatch steps of several bytecodes may be combined into a single advance and dispatch step which significantly decreases the execution time needed for such a bytecode sequence.

As an example, assume that the Java source code statement X:=A+B was compiled into bytecodes represented by the following instructions:

Load A

2. Load B

3. Add

4. Store X

The Java virtual machine is a stack based machine. Therefore, after the values of A and B are loaded onto the stack, these values are added and removed from the stack with the result being placed on the stack. The result on the stack is then stored in X and the result is removed from the stack.

When the above virtual machine instructions are interpreted, each of the execute, advance and dispatch steps will take a certain amount of time which may vary from instruction to instruction. Accordingly, the time it takes the interpreter to execute an instruction will be the sum of the time it takes to execute each of the execute, advance and dispatch steps for that instruction. The time it takes to execute a step will be represented by $E_n$ for execute, $A_n$ for advance and $D_n$ for dispatch, where the subscript indicates the number of the instruction to which the time is associated.

The time it takes the interpreter to execute the virtual machine instructions shown above will be the sum of the following times which may occur in this order: $E_1, A_1, D_1, E_2, A_2, D_2, E_3, A_3, D_3, E_4, A_4, D_4$. With an embodiment of the present invention, a sequence of virtual machine instructions as shown above may be compiled into native machine instructions in the form of a "snippet" so that all but the last advance and dispatch steps may be removed.

As a snippet includes a sequence of native machine instructions, the advance and dispatch steps between the instructions may be eliminated. Therefore, the execution time of the snippet will be approximately the sum of the following times in this order: $E_1, E_2, E_3, E_4, A_S, D_S$, where the subscript "S" indicates these times represent the snippet advance and dispatch steps which may be different than the traditional advance and dispatch steps. Since the initial advance and dispatch steps are no longer needed to advance the bytecode pointer and fetch the next bytecode, the snippet includes an optimized interpretation cycle for a sequence of bytecodes while preserving interpreter semantics. Conceptually, therefore, a snippet may be considered as an implementation of a higher level bytecode that implements the operations of a sequence of lower level bytecodes.

Figure 4:
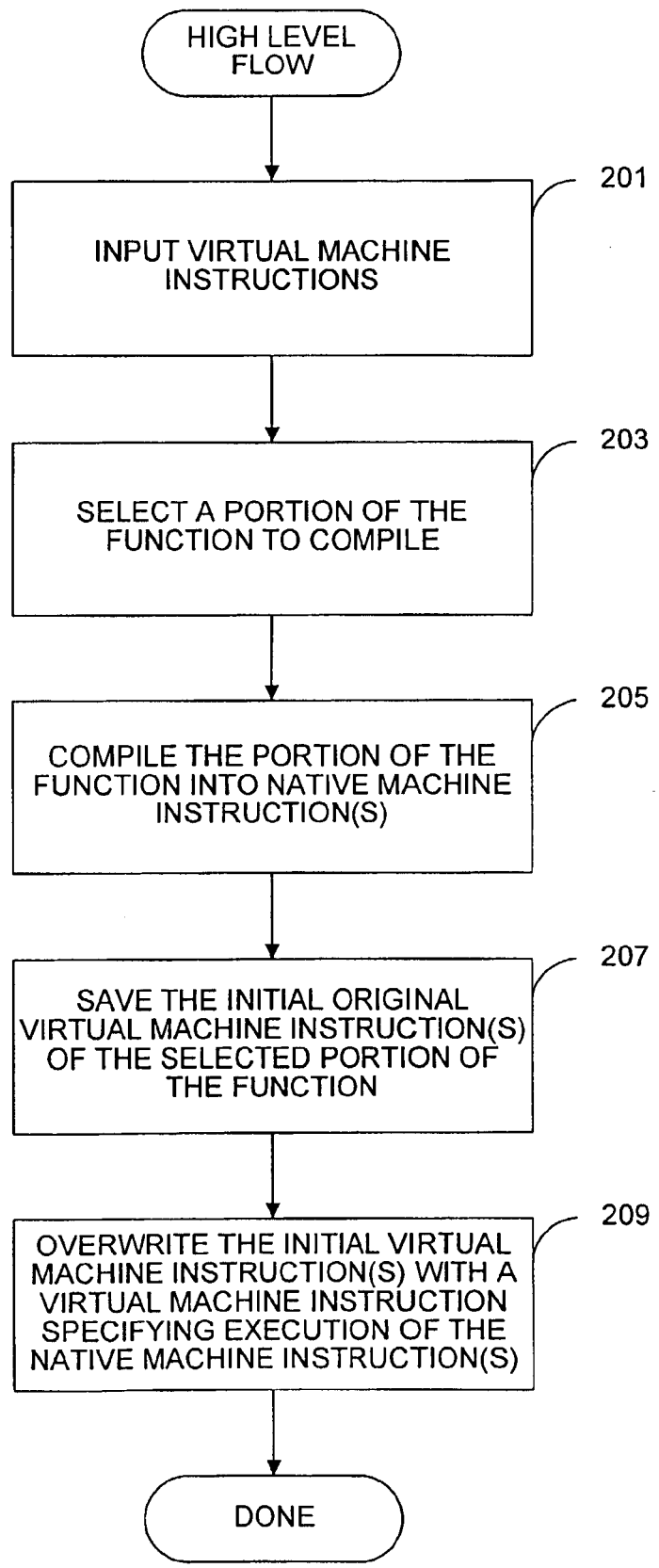
FIG. 4 shows a high level flowchart illustrating a process of transforming a function into a hybrid of virtual and native machine instructions in accordance with one embodiment of the present invention.

FIG. 4 shows a high level flowchart of a process of generating a hybrid of virtual and native machine instructions for a function in accordance with one embodiment of the present invention. At step 201, virtual machine instructions for a function are input into a computer system, such as the ones shown in FIGS. 1 and 2. In preferred embodiments, the virtual machine instructions for a function are stored as a class file of bytecodes. However, the invention may be readily extended into other interpreted languages by an extension of the principles described herein.

A portion of the virtual machine instructions of the function is selected to be compiled at step 203. Typically, the system recognizes individual bytecodes or sequences of bytecodes that may be advantageously compiled. For example, the system may generate a snippet for each Java invoke_virtual bytecode that is encountered. Since the invoke_virtual op code may be optimized when it is compiled into native machine instructions within a snippet (see also the section entitled "In-line Caching"). Additionally, statistics may be collected during the interpretation of a program in order to identify portions of the program that would benefit from having a snippet generated.

At step 205, the selected portion of the function is compiled into one or more native machine instructions. Although snippets usually include more than one native machine instruction, the number of machine instructions is dependent on the virtual machine instructions for which the snippet is replacing.

The virtual machine instruction at the beginning of the selected portion of the function is saved at step 207. It is not required in all instances that the entire virtual machine instruction be saved. For example, in some embodiments only an initial portion (e.g., first one or more bytes) of a virtual machine instruction are saved. Therefore, when it is stated that a virtual machine instruction is saved, it should be understood that it is meant that at least an initial portion of the virtual machine instruction is saved. Furthermore, in some embodiments more than one virtual machine instruction at the beginning of the selected portion of the function may be saved. It will be readily understood by those of skill in the art that the number of bytes or virtual machine instructions that are saved (or overwritten) may be varied in different embodiments and may depend on the virtual machine instructions themselves.

In order for the snippet to be executed, a new virtual machine instruction (called "go_native" in a preferred embodiment) is executed which specifies the subsequent execution of the snippet. This new virtual machine instruction replaces or overwrites the initial virtual machine instruction of the selected portion of the function. So that the original function or computer program may be restored, the original virtual machine instruction at the beginning of the selected portion is saved, at step 207, prior to being overwritten. This process will be described in more detail upon reference to FIG. 5 which illustrates how Java virtual machine instructions of a function may be transformed into hybrid virtual and native machine instructions.

At step 209, the virtual machine instruction at the beginning of the selected portion of the function is overwritten with a new virtual machine instruction that specifies the execution of the one or more native machine instructions of the snippet. In the Java virtual machine, the virtual machine instructions are bytecodes meaning that each virtual machine instruction is composed of one or more bytes. The examples described herein refer to preferred embodiments which increase the execution speed of programs for the Java virtual machine. However, the invention may be advantageously applied to other interpreted languages where the virtual machine instructions may not necessarily be bytecodes.

During execution of an interpreted program, the interpreter decides when to substitute a sequence of bytecodes with a snippet. In a preferred embodiment, if a sequence of bytecodes which may be replaced by a snippet has been found, the interpreter generates a snippet for the sequence and then overwrites the first three bytes of that sequence with a go_native bytecode and a two byte number specifying the snippet. The go_native bytecode is an unused bytecode which is selected for use of the invention.

The snippet will not only hold the native machine instructions, but also the three bytes of the original bytecode that was overwritten as well as a pointer back to their original location so that the snippet may be removed and the original bytecodes restored.

Figure 5:
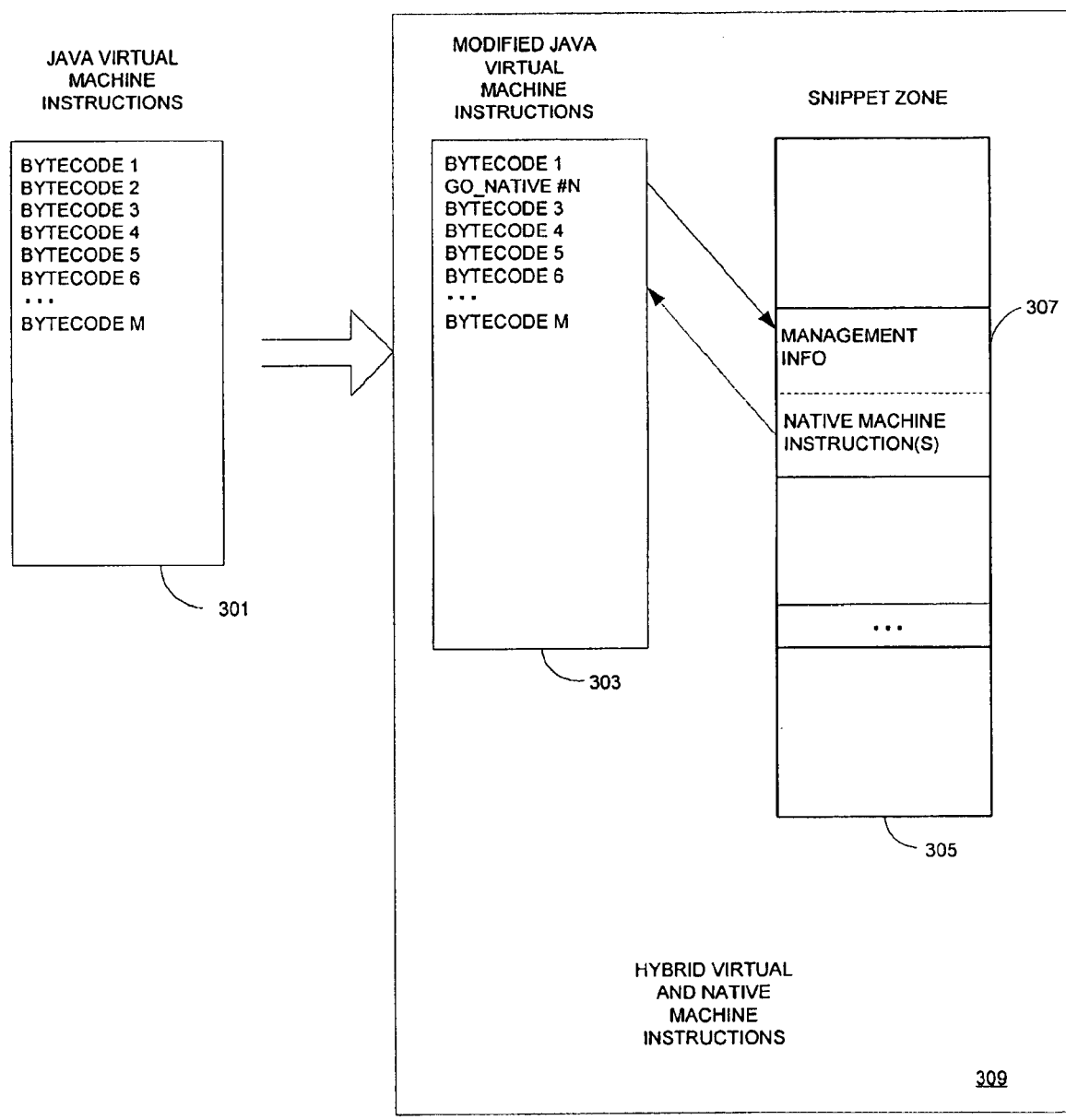
FIG. 5 illustrates a transformation of Java virtual machine instructions of a function to hybrid virtual and native machine instructions.

FIG. 5 shows a generation of hybrid virtual and native machine instructions. Java virtual machine instructions 301 are bytecodes where each bytecode may include one or more bytes. The Java virtual machine instructions typically reside in a Java class file as is shown in FIG. 3. In the example shown, the interpreter decides to introduce a snippet for bytecodes 2–5 of virtual machine instructions 301. The interpreter generates modified Java virtual machine instructions 303 by overwriting bytecode 2 with a go_native virtual machine instruction.

A snippet zone 305 stores snippets which include native machine instructions. As shown, the go_native bytecode includes a pointer or index to a snippet 307. Each snippet is a data block that includes two sections of which the first is management information and the second is a sequence of one or more native machine instructions. The management information includes storage for the original bytecode 2 which was overwritten by the go_native bytecode and also the original address of bytecode 2 so that the original bytecode sequence may be restored when the snippet is removed. Typically, the management information section of the snippet is of a fixed length so that the native machine instructions may be easily accessed by a fixed offset. Although snippet 307 is shown as occupying a single "chunk" in snippet zone 305, snippets may also be allocated that occupy more than one chunk of the snippet zone.

The native machine instruction section of snippet 307 includes native machine instructions for bytecodes 2–5 of virtual machine instructions 301. Hybrid virtual and native machine instructions 309 include the modified virtual machine instructions and the snippets in the snippet zone. When the interpreter executes the go_native bytecode, the interpreter will look up the snippet in the snippet zone specified by the go_native bytecode and then activate the native machine instructions in the snippet.

The native machine instructions in the snippet perform the same operations as if the bytecodes 2–5 would have been interpreted. Afterwards, the interpreter continues with the execution of bytecode 6 as if no snippet existed. The return of execution in virtual machine instructions 301 is indicated by the dashed arrow in hybrid virtual and native machine instructions 309 shown in FIG. 5.

The go_native bytecode references (e.g., has a pointer to) the snippet and the snippet includes a reference to the location of the go_native bytecode. The go_native bytecode in a preferred embodiment is 3 bytes long: one for the go_native op code and two bytes for an index into the snippet zone. The two-byte index allows for over 65,000 snippets in the snippet zone. Within the snippet management information section is stored the address of the original bytecode which is currently occupied by the go_native bytecode. This address is utilized to write the original bytecode also stored in the management information section back to its original location. Although a preferred embodiment utilizes a three byte go_native bytecode, there is no requirement that this size be utilized. For example, any number of bytes may be utilized or the size does not have to be limited to byte boundaries.

Snippets should be introduced selectively because it takes time to generate the snippets and because the snippets consume memory space. In a preferred embodiment, snippets are introduced for the following: all or portions of loop bodies, special Java bytecodes (e.g., get_static and put_static), and Java message sends (all the invokexxx bytecodes). In the bytecodes for Java virtual machine, loops are implemented using backward branches. Thus, whenever the interpreter encounters a backward branch, it may introduce a snippet. The snippet generator generates as much native code that will fit into the snippet, starting with the backward branch bytecode. Additionally, some special Java bytecodes and Java message sends may be sped up by using snippets.

Figure 6:
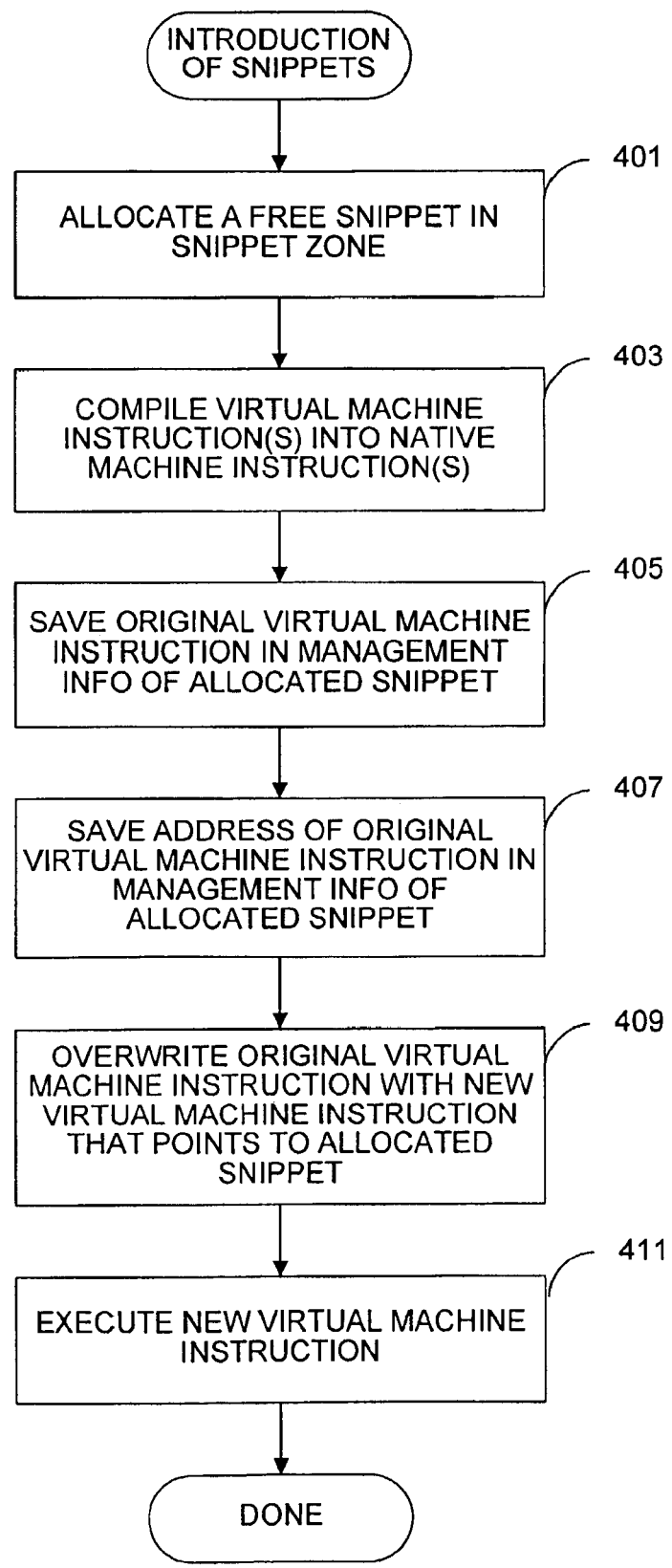
FIG. 6 shows a process of introducing snippets which are native machine instructions compiled from a sequence of virtual machine instructions of a function.

FIG. 6 shows a process of introducing a snippet. At step 401, the system allocates a free snippet in the snippet zone. The free snippet is storage space within the snippet zone which has not been utilized or has been marked as available. One process of allocating a free snippet will be described in more detail in reference to FIG. 7.

Once a free snippet has been obtained, the one or more virtual machine instructions are compiled into one or more native machine instructions at step 403. Although the flowcharts show an order to the steps, no specific ordering of the steps should be implied from the figures. For example, it is not necessary that a free snippet be allocated before the virtual machine instructions are compiled into native machine instructions. In fact, in some embodiments it may be beneficial to compile the virtual machine instructions first and then allocate a free snippet to store the native machine instructions, especially if a snippet may span more than one chunk in the snippet zone.

At step 405, a copy of a selected virtual machine instruction is saved in the management information section of the allocated snippet. The selected virtual machine instruction is the virtual machine instruction that was originally at the beginning of the compiled virtual machine instructions of a function. However, in some embodiments only an initial portion (one or more bytes) of the original virtual machine instruction is saved in the snippet. The address of the original virtual machine instruction in the function is saved in the management information section of the allocated snippet at step 407.

At step 409, the original virtual machine instruction is overwritten with a new virtual machine instruction (e.g., go_native) that points to the allocated snippet. As snippets are generated during program execution, the new virtual machine instruction is executed at step 411.

A snippet may be introduced at arbitrary locations in a bytecode program. However, if the go_native bytecode spans across more than one of the original bytecodes it should be verified that the second and subsequent original bytecodes overwritten by the go_native bytecode are not jump targets or subroutine entry points. More generally, a go_native bytecode should not be used across a basic block entry point. Nevertheless, backward branches as well as many other Java bytecodes are at least three bytes long, thereby providing plenty of storage space for a go_native bytecode. It should be mentioned that a jump to a bytecode after the go_native bytecode which has been compiled into a snippet will not present any problems since the bytecode remains untouched at that location.

Snippets are held and managed in a separate memory space called the snippet zone. The snippet zone may be thought of as a circular list of snippets where a snippet is allocated by either finding an unused snippet in the snippet zone or by recycling a used snippet. Preferably all snippets have the same size to simplify management of the snippet zone. In general, the more snippets that are present in the snippet zone, the longer it will take before a snippet has to be recycled and therefore the faster the program will run.

Figure 7:
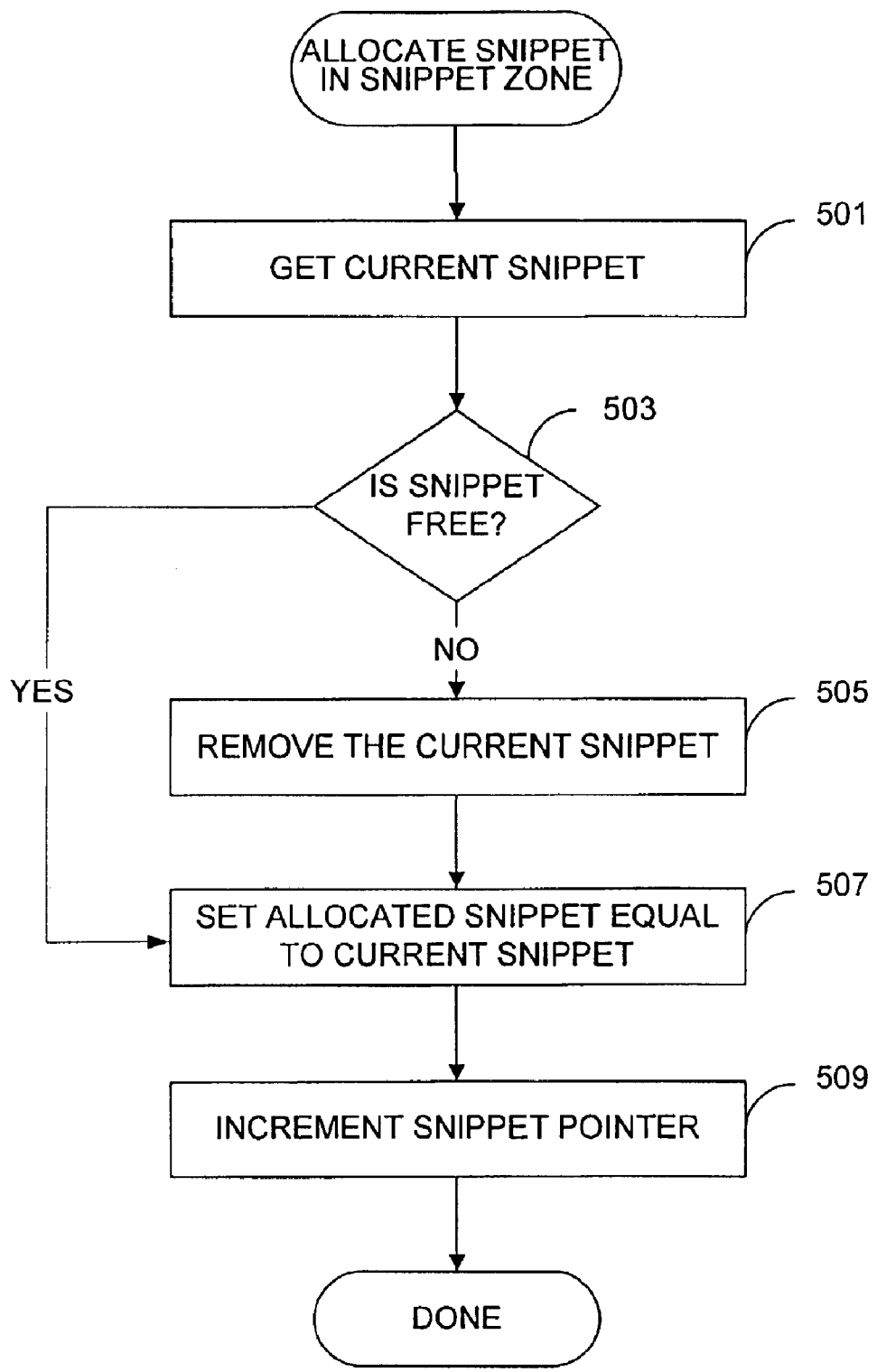
FIG. 7 shows a process of allocating a snippet in the snippet zone which stores all existing snippets.

Now that it has been shown how a snippet may be introduced, FIG. 7 shows a process of allocating a snippet in the snippet zone which was shown as step 401 in FIG. 6. The process shown in FIG. 7 utilizes a round robin fashion to allocate snippets (i.e., as soon as a new snippet is needed and there are no unused snippets left, the next snippet in the circular list of snippets of the snippet zone is recycled).

At step 501, the system gets the current snippet. The current snippet in the snippet zone is indicated by a snippet pointer. The system determines if the current snippet is free to be used at step 503. A flag may be present in the management information section of the snippet to indicate whether the snippet is available. In some embodiments, the field in the management information section of the snippet which stores the address of the original bytecode is set to null if the snippet is available.

If the current snippet is not free, the current snippet is removed at step 505. Removing the current snippet includes writing the original bytecode stored in the management information section of the snippet to the address of the original bytecode also stored in the management section of the snippet. A process of removing a snippet will be described in more detail in reference to FIG. 9.

After a snippet has been allocated in the snippet zone, the allocated snippet is set equal to the current snippet, at step 507, since now the current snippet is free. At step 509, the system increments the snippet pointer. Although the snippet zone may be thought of as a circular list, the snippet zone may be implemented as an array of chunks. Therefore, if the snippet zone is a linear array, incrementing the snippet pointer may also involve resetting the snippet pointer to the beginning of the snippet zone if the snippet pointer has passed the end of the snippet zone.

Another approach to managing snippets in the snippet zone is to use a time stamp that is stored in the management information section of the snippet indicating the time when the snippet was created or last used. Since it may take substantial resources to find the snippet with the oldest time stamp to be recycled, a combination of time stamps and the round robin fashion may be utilized as follows.

When a free snippet is required, the system may search a predetermined number of snippets after the snippet pointer (e.g., 5 or 10 snippets) in order to locate a snippet with an old time stamp. The snippet with the oldest time stamp near the snippet pointer may then be recycled. Additionally, the time stamp field in the management information section of the snippet may be set to zero or an old time stamp in order to mark the snippet as free.

Figure 8:
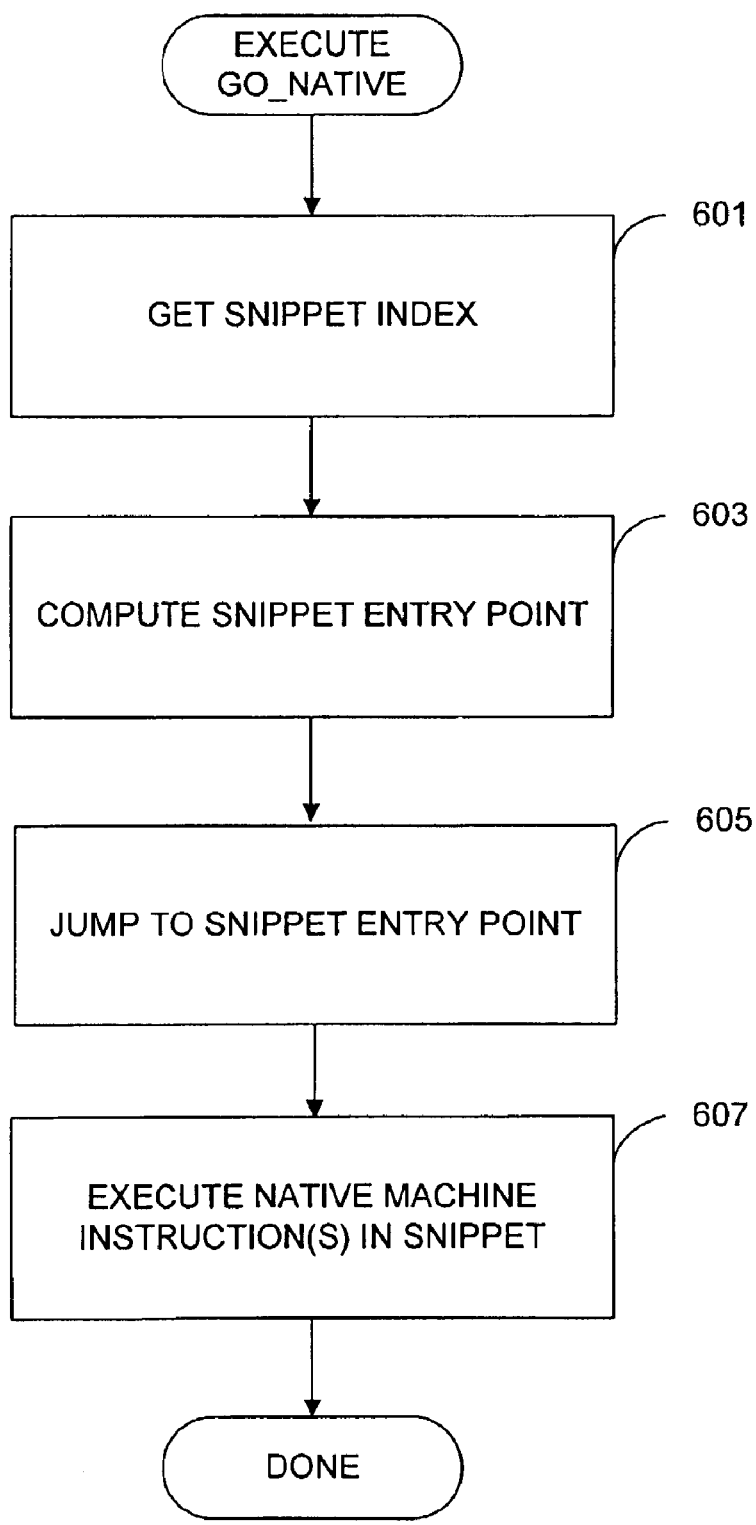
FIG. 8 shows a process of executing a go_native virtual machine instruction that specifies the execution of native machine instructions in a snippet.

Now that it has been shown how a snippet may be set up, FIG. 8 shows a process of executing a go_native bytecode. At step 601, the system gets the snippet index or pointer from the go_native bytecode. The snippet index may be a 2 byte offset into the snippet zone. The system computes the snippet entry point of the native machine instructions within the snippet at step 603. The snippet entry point is the location of the native machine instructions after the management information section of the snippet. Since the management information section is typically a fixed size, calculating the snippet entry point typically includes adding an offset to the address of the snippet.

The system then jumps to the snippet entry point at step 605 in order to begin execution of the native machine instructions of the snippet. The native machine instructions in the snippet are executed in a step 607.

Although the implementation of snippets increases the speed of execution of the interpreted code, it is also desirable to provide the capability to reverse the introduction of snippets in order to generate the original bytecodes. For example, after a program in memory has executed, it may be desirable to generate a listing of the original bytecodes without requiring that the original class files be available for access.

Figure 9:
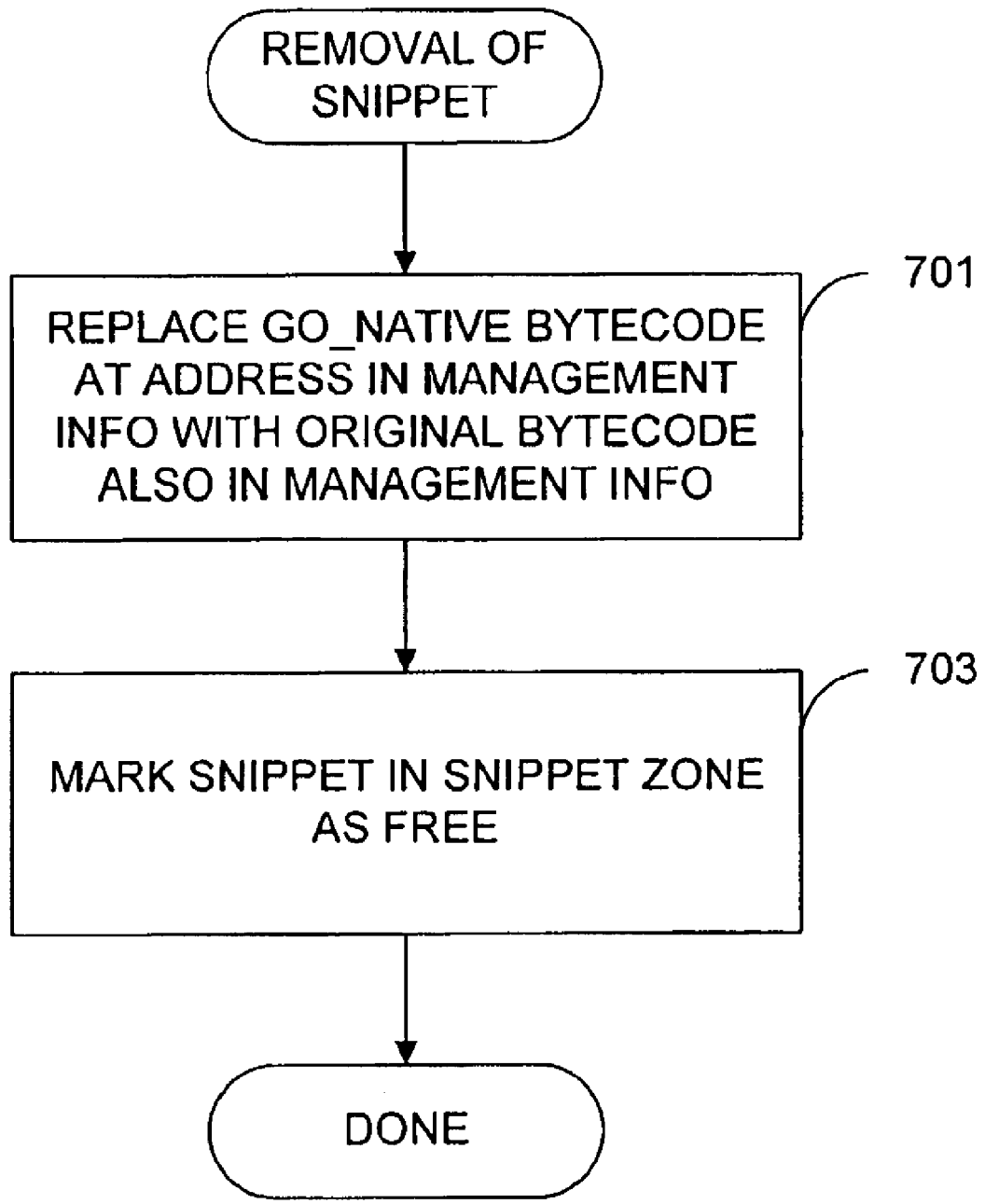
FIG. 9 shows a process of removing a snippet from the hybrid, virtual, and native machine instructions of a function.

FIG. 9 shows a process of removing a snippet in order to produce the original bytecodes. At step 701, the system replaces the go_native bytecode at the address stored in the management information section of the snippet with the original bytecode (or its initial bytes) also stored in the management information section. The address stored in the management information section acts as a back pointer to the original bytecode.

Once the original bytecodes are restored, the snippet may be marked as free in the snippet zone at step 703. The snippet may be marked free in any number of ways depending upon the implementation of the snippet zone. For example, a null pointer may be stored in the address of the original bytecode within the management information section of the snippet. Additionally, if time stamps are being utilized, the time stamp may be set to zero or an old value in order to mark the snippet as free in the snippet zone.

The preceding has described how the invention utilizes dynamically generated native machine instructions for sequences of interpreted code so that a function may be more efficiently executed utilizing a hybrid of virtual and native machine instructions. The execution of an interpreted program can be significantly sped up because frequently used code sequences may be executed in native code rather than an interpreted fashion. The snippets generated are transparent to the interpreter and impose no additional states or complexity. The following will describe implementations of specific virtual machine instruction situations.

In-Line Caching

In the Java virtual machine, the invoke_virtual bytecode is utilized to invoke "normal" functions. The invoke_virtual bytecode includes two bytes which, among other things, specify a function to be invoked. During interpretation of the invoke_virtual bytecode, the interpreter first decodes and executes the invoke_virtual bytecode. The execution of the invoke_virtual bytecode involves fetching the two bytes and determining the starting address of the specified function. However, the determination of the starting address of the specified function may include following multiple levels of pointers to find the class that includes the function. Consequently, the interpretation of an invoke_virtual bytecode maybe be very time consuming.

Figure 10:
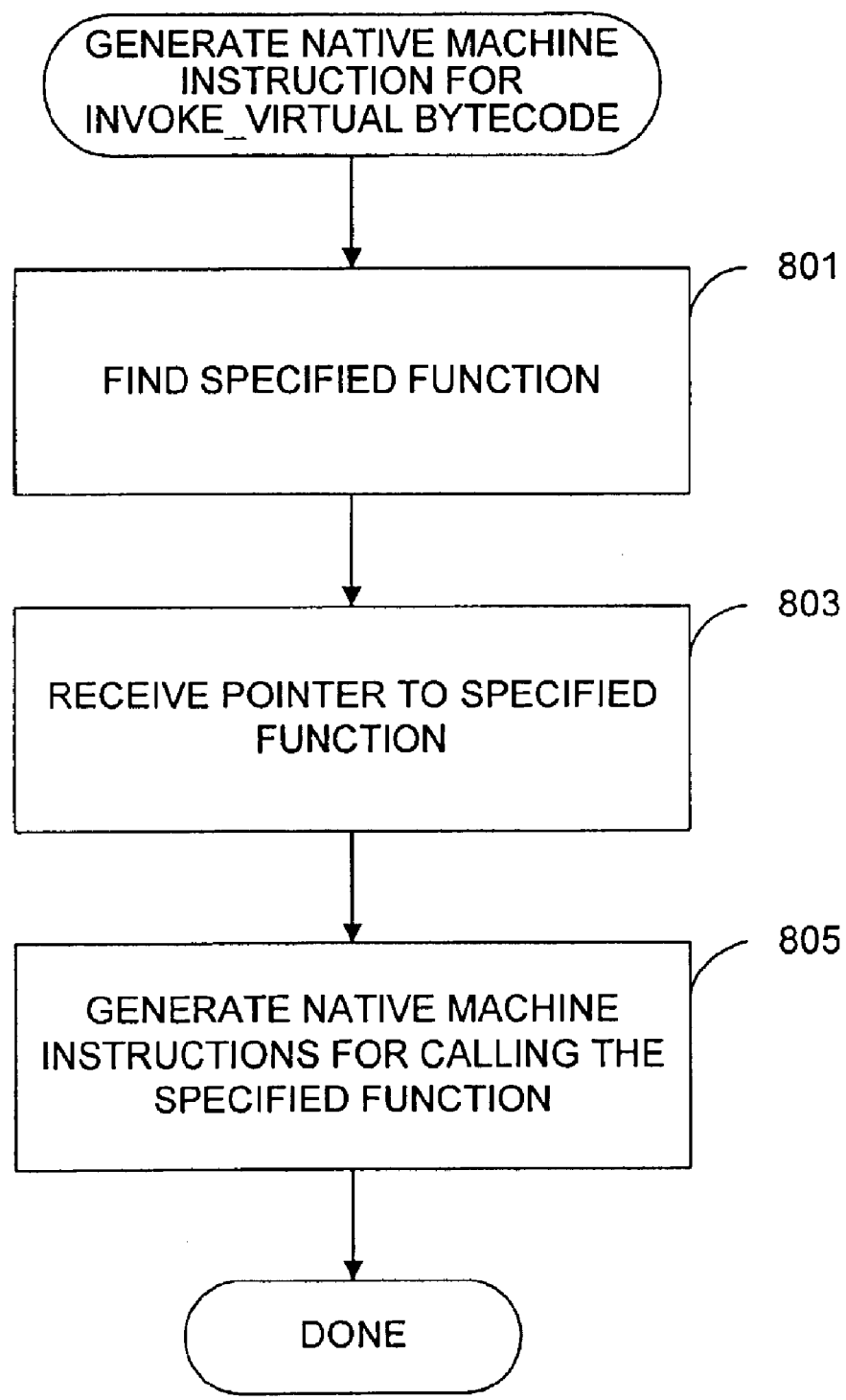
FIG. 10 shows a process of generating native machine instructions for the invoke_virtual bytecode.

Snippets may be utilized to expedite the execution of the invoke_virtual bytecode by compiling the invoke_virtual bytecode into the native machine instruction equivalent of "call <function>" (i.e., the starting address of the function is specified without requiring a time consuming search for the starting address of the function). FIG. 10 shows a process of generating a native machine instruction for the invoke_virtual bytecode.

At step 801, the system finds the function specified in the invoke_virtual bytecode. The process for finding the specified may be the same as is executed by an interpreter (e.g., pointers from class definitions will be followed to find the specified function). Once the specified function is found, the system receives a pointer or address to the specified virtual function at step 803.

The system then generates native machine instructions for calling the specified virtual function at step 805. The native machine instructions include the address of the specified function so that execution of the invoke_virtual bytecode will no longer necessitate the time consuming process of finding the starting address of the specified function. By "hard coding" the address of the desired function in native machine instruction, there is a substantial increase in the speed of execution of the invoke_virtual bytecode.

Figure 11:
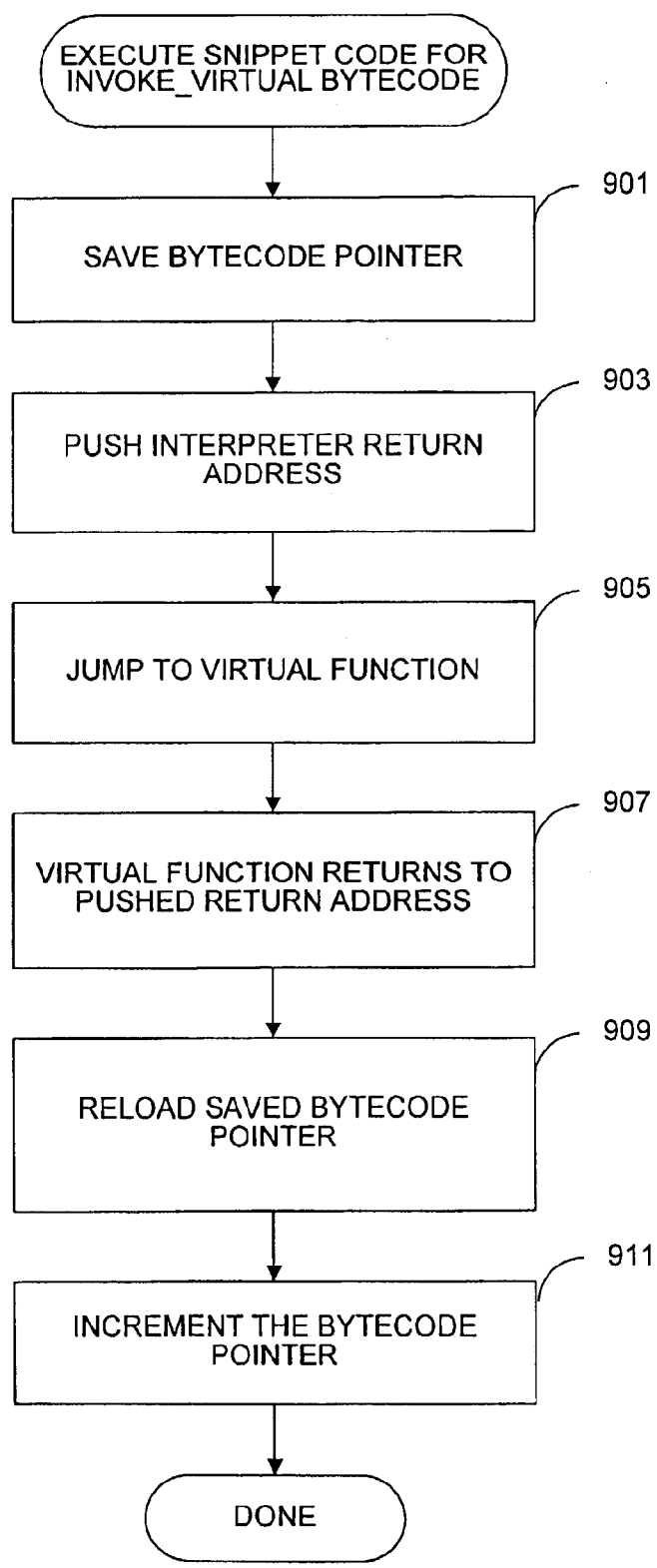
FIG. 11 shows a process of executing snippet code for the invoke_virtual bytecode.

Now that it has been described how the go_native bytecode for implementing the invoke_virtual bytecode has been set up, FIG. 11 shows a process of executing snippet code for the invoke_virtual bytecode. At step 901, the system saves the current bytecode pointer so that the interpreter can continue at the right location after returning from the function invoked by the invoke_virtual bytecode.

The system pushes the interpreter return address on the stack at step 903. The interpreter return address is a predefined location where the execution of the interpreter from invoke_virtual bytecodes should resume. The native machine instructions in the snippet for the invoke_virtual function then instruct the system to jump to the function specified in the invoke_virtual bytecodes at step 905.

Once the virtual function finishes execution, the system returns to the return address that was pushed on the stack at step 907. At the return address, there are native machine instructions for the interpreter to reload the saved bytecode pointer. At step 909, recalling that the bytecode pointer was saved at step 901, the system reloads the saved bytecode pointer so the interpreter may continue where it left off. The interpreter increments the bytecode pointer, at step 909, in order to indicate the bytecode that should be interpreted next.

As shown above, snippets may be utilized to increase the execution performance of the invoke_virtual bytecode. Other Java bytecodes may be similarly optimized including the invoke_static, invoke_interface, and invoke_special.

Arbitrary Sequences

As described earlier, snippets may be generated for arbitrary sequences of virtual machine instructions. The arbitrary sequences of virtual machine instructions may be selected any number of ways including a statistical analysis that determines execution speed will be increased upon snippetization of the identified sequence of virtual machine instructions.

Figure 12:
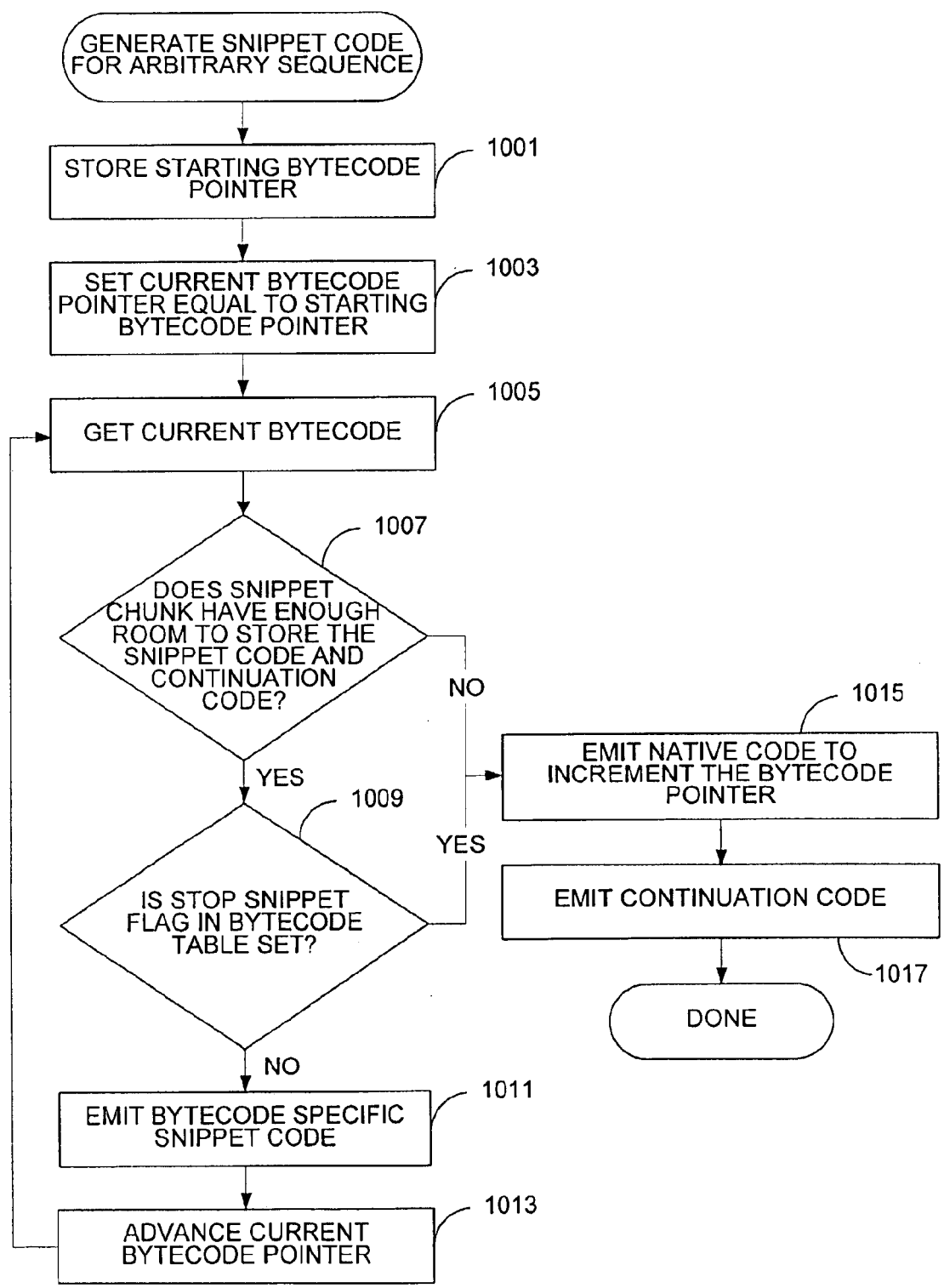
FIG. 12 shows a process of generating snippet code for an arbitrary sequence of virtual machine instructions in a function.

FIG. 12 shows a process for generating snippet code for an arbitrary sequence of virtual machine instructions. At step 1001, the system stores the starting bytecode pointer. The starting bytecode pointer indicates the first bytecode that is represented by the snippet that will be generated. At step 1003, the system sets the current bytecode pointer equal to the starting bytecode pointer. The current bytecode pointer will be utilized to "walk through" the bytecodes as they are compiled and placed in the snippet. The system gets the current bytecode at step 1005. The current bytecode is specified by the current bytecode pointer.

At step 1007, the system determines if the snippet has enough room to store the snippet code for the current bytecode and some continuation code. The continuation code is the native machine instructions that implement the equivalent of the advance and fetch steps in the interpretation cycle. If the snippet chunk has enough room, the system determines if a stop snippet flag is set in the bytecode table at step 1009. The bytecode table is a table maintained by the system to store information about the various bytecodes. This table is shown in FIG. 13 and will be described in more detail later but for the purposes of this flowchart the bytecode table includes a flag which is set in the table for each bytecode to indicate to the system that upon encountering the bytecode, snippet generation should terminate.

At step 1011, the system emits snippet code (e.g., native machine instructions) specific for the current bytecode. The bytecode specific snippet code may also be stored in the bytecode table as shown in FIG. 13. The system advances the current bytecode pointer at step 1013, and then returns to step 1005 to get the next bytecode to analyze.

If snippet generation is to be terminated, the system emits native machine instructions to increment the bytecode pointer at step 1015. The bytecode pointer should be incremented by the number of byte used by the bytecodes which were placed in the snippet. The system then emits the continuation code at step 1017. The continuation code is native machine instructions that jump to the address of the interpreter that interprets the next bytecode. The continuation code may be the same for some bytecodes.

Figure 13:
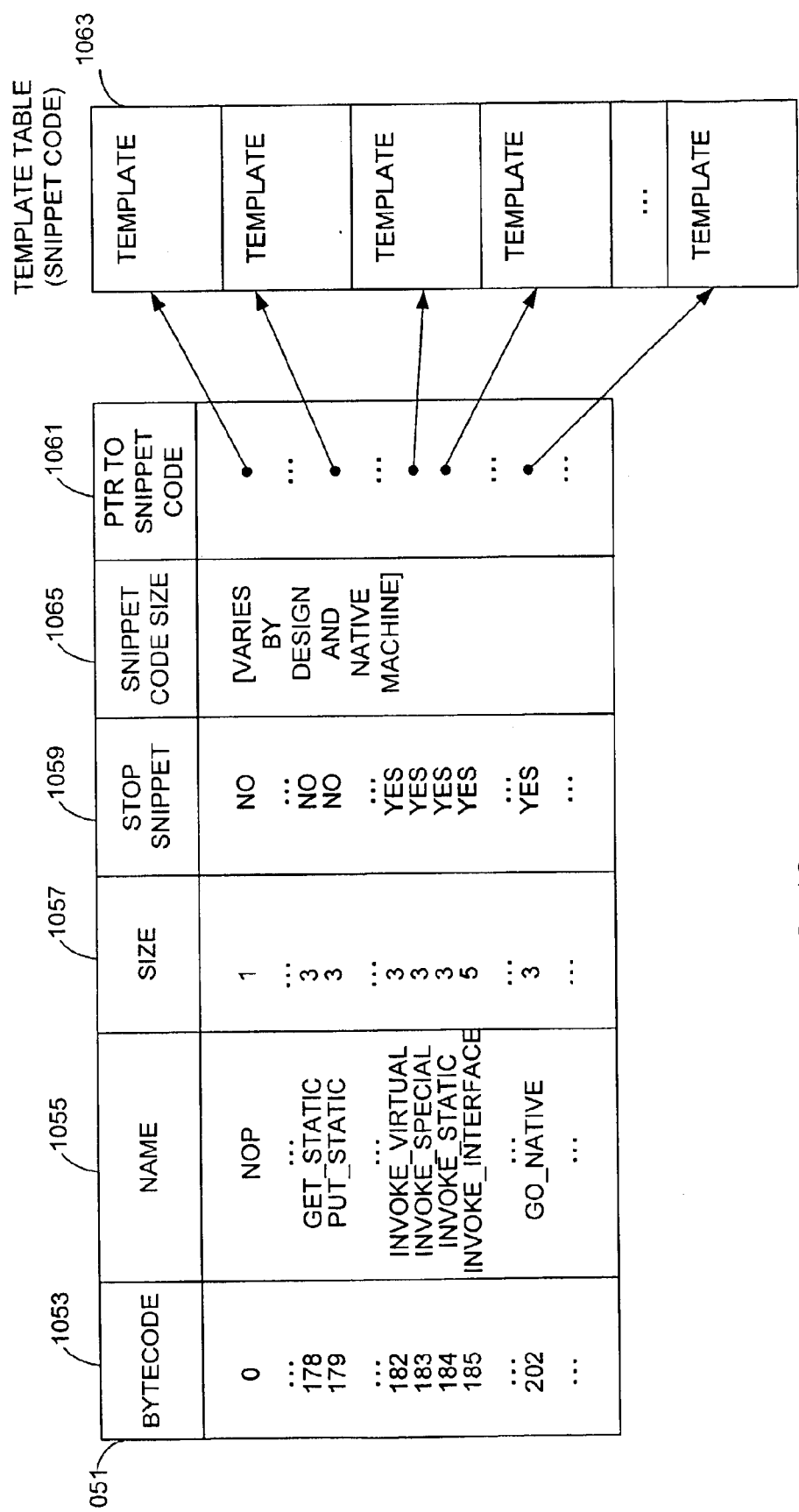
FIG. 13 illustrates a bytecode table which may be utilized to store information regarding different Java bytecodes.

FIG. 13 shows a bytecode table that may be utilized to store information regarding different Java bytecodes. A bytecode table 1051 includes information regarding each of the bytecodes of the virtual machine instructions. In a preferred embodiment, the bytecode table is generated once when the Java virtual machine is initialized. As shown, a bytecode value 1053 (shown in decimal), name of the bytecode 1055 and size of the bytecode 1057 (number of bytes it occupies) are stored in the bytecode table. Additionally, a stop snippet flag 1059 as described in reference to FIG. 12 indicates whether the bytecode should terminate snippet generation when it is encountered.

The bytecode table may include a pointer to snippet code 1061 for each bytecode to which native machine instructions will be generated. Thus, as shown, a template table 1063 may be utilized to store templates for the native machine instructions for each bytecode. The template table allows for fast generation of snippets as the native machine instructions for the bytecodes may be easily determined upon reference to template table 1063. Additionally, the templates of native machine instructions may also be used to interpret the bytecodes. Another column in bytecode table 1051 may indicate a snippet code size 1065 of the template in the template table.

CONCLUSION

While the above is a complete description of preferred embodiments of the invention, there is alternatives, modifications, and equivalents may be used. It should be evident that the invention is equally applicable by making appropriate modifications to the embodiments described above. For example, the embodiments described have been in reference to increasing the performance of the Java virtual machine interpreting bytecodes, but the principles of the present invention may be readily applied to other systems and languages. Therefore, the above description should not be taken as limiting the scope of the invention which is defined by the metes and bounds of the appended claims along with their full scope of equivalents.

What is claimed is:

1. In a computer system, a method for increasing the execution speed of virtual machine instructions at runtime, the method comprising:
   receiving a first virtual machine instruction;
   generating, at runtime, a new virtual machine instruction that represents or references one or more native instructions that can be executed instead of said first virtual machine instruction; and
   executing said new virtual machine instruction instead of said first virtual machine instruction.

2. The method of claim 1, further comprising overwriting a selected virtual machine instruction with a new virtual machine instruction, the new virtual machine instruction specifying execution of the at least one native machine instruction.

3. The method of claim 2, wherein the new virtual instruction includes a pointer to the at least one native machine instruction.

4. The method of claim 2, further comprising storing the selected virtual machine instruction before it is overwritten.

5. The method of claim 2, further comprising storing a back pointer to a location of the new virtual machine instruction.

6. The method of claim 2, wherein the new virtual machine instruction includes a pointer to a data block in which is stored the at least one native machine instruction, a copy of the selected virtual machine instruction, and a back pointer to location of the new virtual machine instruction.

7. The method of claim 6, further comprising generating the virtual machine instruction that were input by storing the copy of the selected virtual machine instruction stored in the data block at the location specified by the back pointer.

8. In a computer system, a method for increasing the execution speed of virtual machine instructions, the method comprising:
   inputting virtual machine instructions for a function;
   compiling a portion of the function into at least one native machine instruction so that the function includes both virtual and native machine instruction;
   representing said at least one native machine instruction with a new virtual machine instruction that is executed after the compiling of the fuction.

9. A stored data structure of hybrid virtual and native machine instructions, comprising:
   a sequence of virtual machine instructions for a function including a new virtual machine instruction;
   at least one native machine instruction specified by the new virtual machine instruction for execution with the sequence of virtual machine instructions; and
   a computer readable medium that stores the sequence of virtual machine instructions and the at least one native machine instruction;
   wherein
      the at least one native machine instruction is stored in a data block, and
      the data block stores a copy of a selected virtual machine instruction that was overwritten in the sequence of virtual machine instructions by the new virtual machine instruction.

10. The stored data structure of claim 9, wherein the new virtual machine instruction includes a pointer to the at least one native machine instruction.

11. The stored data structure of claim 9, wherein the block stores a pointer to a location of the new virtual machine instruction in the sequence of virtual machine instructions.

12. The stored data structure of claim 9, wherein the data block is stored in an array of blocks.

13. The stored data structure of claim 9, wherein the at least one native machine instruction is generated from a compilation of a portion of the sequence of virtual machine instructions beginning with the selected virtual machine instruction.

14. The stored data structure of claim 9, wherein the virtual machine instruction are Java virtual machine instructions.

* * * * *

UNITED STATES PATENT AND TRADEMARK OFFICE
CERTIFICATE OF CORRECTION

PATENT NO. : 6,910,205 B2
DATED : June 21, 2005
INVENTOR(S) : Bak et al.

It is certified that error appears in the above-identified patent and that said Letters Patent is hereby corrected as shown below:

Column 13,
Line 59, change "new virtual" to -- new virtual machine --.

Column 14,
Lines 13 and 58, change "machine instruction" to -- machine instructions --.
Line 25, change "the fuction" to -- the function --.

Signed and Sealed this

Sixth Day of September, 2005

JON W. DUDAS
*Director of the United States Patent and Trademark Office*